(12) United States Patent
Platt

(10) Patent No.: US 6,817,244 B2
(45) Date of Patent: Nov. 16, 2004

(54) METHODS AND SYSTEMS FOR ACTIVELY CONTROLLING MOVEMENT WITHIN MEMS STRUCTURES

(75) Inventor: William P. Platt, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 10/337,008

(22) Filed: Jan. 6, 2003

(65) Prior Publication Data

US 2004/0129076 A1 Jul. 8, 2004

(51) Int. Cl.$^7$ ................................................ G01P 9/04
(52) U.S. Cl. ............................... 73/504.16; 73/504.12
(58) Field of Search .......................... 73/504.16, 504.04, 73/504.12, 504.14, 862.59; 310/309

(56) References Cited

U.S. PATENT DOCUMENTS

| | | |
|---|---|---|
| 5,025,346 A | 6/1991 | Tang et al. |
| 5,349,855 A | 9/1994 | Bernstein et al. |
| 5,392,650 A | 2/1995 | O'Brien et al. |
| 5,458,000 A | 10/1995 | Burns et al. |
| 5,481,914 A | 1/1996 | Ward |
| 5,496,436 A | 3/1996 | Bernstein et al. |
| 5,530,342 A | 6/1996 | Murphy |
| 5,581,035 A | 12/1996 | Greiff |
| 5,600,064 A | 2/1997 | Ward |
| 5,604,309 A | 2/1997 | Ward |
| 5,608,351 A | 3/1997 | Ward |
| 5,646,348 A | 7/1997 | Greiff et al. |
| 5,672,949 A | 9/1997 | Ward |
| 5,703,292 A | 12/1997 | Ward |
| 5,892,153 A | 4/1999 | Weinberg et al. |
| 5,911,156 A * | 6/1999 | Ward et al. ............... 73/504.16 |
| 5,952,574 A | 9/1999 | Weinberg et al. |
| 6,040,625 A | 3/2000 | Ip |
| 6,230,566 B1 | 5/2001 | Lee et al. |
| 6,257,059 B1 * | 7/2001 | Weinberg et al. ........ 73/504.16 |
| 6,311,556 B1 | 11/2001 | Lefort et al. |
| 6,350,983 B1 | 2/2002 | Kaldor et al. |
| 6,426,538 B1 | 7/2002 | Knowles |
| 6,481,285 B1 | 11/2002 | Shkel et al. |
| 2001/0042404 A1 | 11/2001 | Yazdi et al. |
| 2002/0066317 A1 | 6/2002 | Lin |
| 2002/0093067 A1 | 7/2002 | Knowles |
| 2002/0167248 A1 | 11/2002 | Chua et al. |
| 2002/0178817 A1 | 12/2002 | Selvakumar et al. |
| 2002/0184949 A1 | 12/2002 | Gianchandani et al. |

* cited by examiner

Primary Examiner—John E. Chapman
(74) Attorney, Agent, or Firm—Matthew Luxton, Esq.; Armstrong Teasdale LLP

(57) ABSTRACT

A method for reducing effects of common mode oscillations between two respective proof masses in microelectromechanical systems (MEMS) devices is described. The MEMS devices also include a motor pickoff comb, a sense plate, and a motor drive comb for each proof mass. The method includes amplifying signals received from respective motor pickoff combs, inverting the amplified signal from one of the motor pickoff combs, and generating a difference signal between the inverted, amplified signal from one pickoff comb, and the non-inverted, amplified signal from the other pickoff comb. The method also includes inputting the difference signal into a control loop and generating motor drive signals for respective motor drive combs with the control loop.

21 Claims, 3 Drawing Sheets

METHODS AND SYSTEMS FOR ACTIVELY CONTROLLING MOVEMENT WITHIN MEMS STRUCTURES

BACKGROUND OF THE INVENTION

This invention relates generally to micro-electromechanical systems (MEMS), and more specifically, to suppression of unwanted frequencies generated during operation of MEMS devices.

Micro-electromechanical systems (MEMS) integrate electrical and mechanical components on the same substrate, for example, a silicon substrate, using microfabrication technologies. The electrical components are fabricated using integrated circuit processes, while the mechanical components are fabricated using micromachining processes that are compatible with the integrated circuit processes. This combination makes it possible to fabricate an entire system on a chip using standard manufacturing processes.

One common application of MEMS devices is in the design and manufacture of sensor devices. The mechanical portion of the sensor device provides the sensing capability, while the electrical portion of the sensor device processes the information received from the mechanical portion. One example of a MEMS device is a gyroscope. Some inertial measurement units (IMUs) incorporate one or more MEMS gyroscopes.

One known type of MEMS gyroscope uses vibrating elements to sense angular rate through the detection of a Coriolis acceleration. The vibrating elements are put into oscillatory motion in a drive plane, which is parallel to the substrate. Once the vibrating elements are put in motion, the gyroscope is capable of detecting angular rates induced by the substrate being rotated about an input plane, which is perpendicular to the substrate. Coriolis acceleration occurs in a sense plane, which is perpendicular to both the drive plane and the input plane. The Coriolis acceleration produces a Coriolis motion having an amplitude proportional to the angular rate of the substrate. However, the vibrating elements sometimes exhibit other oscillatory movements outside of the above described and desired motion. These other oscillations are sometimes referred to as common mode oscillations, and can cause undesired outputs.

BRIEF SUMMARY OF THE INVENTION

In one aspect, a method for reducing effects of common mode oscillations between two respective proof masses in micro-electromechanical systems (MEMS) devices is provided. The MEMS devices include a motor pickoff comb, a sense plate, and a motor drive comb for each proof mass. The method comprises amplifying signals received from respective motor pickoff combs, inverting the amplified signal from one of the motor pickoff combs, and generating a difference signal between the inverted, amplified signal from one pickoff comb, and the non-inverted, amplified signal from the other pickoff comb. The provided method also comprises inputting the difference signal into a control loop and generating motor drive signals for respective motor drive combs with the control loop.

In another aspect, a micro-electromechanical systems (MEMS) device is provided which comprises a substrate, a plurality of motor drive combs attached to the substrate, and a plurality of motor pickoff combs attached to the substrate, the MEMS device further comprises a plurality of proof masses, each proof mass suspended above the substrate and between one of the motor drive combs and one of the motor pickoff combs and a circuit configured to generate motor drive signals for the motor drive combs. The circuit is configured to receive signals from the motor pickoff combs, generate a difference signal between the signals received from the motor pickoff combs, and utilize the difference signal to control amplitude and pulse shape of the motor drive signals to suppress common mode oscillation in the proof masses.

In still another aspect, a circuit for suppressing common mode oscillations in a micro-electromechanical systems (MEMS) device is provided. The circuit comprises an amplifier circuit configured to generate a difference signal from motor pickoff signals received from motor pickoff combs of the MEMS device, and a control loop configured to receive the difference signal from the amplifier circuit. The control loop is configured to control amplitude and pulse shape of motor drive signals output to the MEMS device at least partially based on the difference signal received.

In yet another aspect, a method for suppressing common mode oscillations between proof masses in micro-electromechanical systems (MEMS) devices is provided. The MEMS devices include motor drive combs and motor pickoff combs. The method comprises receiving motor pickoff signals from motor pickoff combs, generating a difference signal from the received motor pickoff signals, and controlling pulse shapes of motor drive signals applied to motor drive combs based upon the difference signal.

In still yet another aspect, a micro-electromechanical systems gyroscope configured to suppress common mode oscillation is provided. The gyroscope comprises a substrate, a plurality of motor drive combs attached to the substrate, a plurality of motor pickoff combs attached to the substrate, and a plurality of proof masses, each proof mass suspended above the substrate and between one of the motor drive combs and one of the motor pickoff combs. The gyroscope further comprises an amplifier circuit configured to receive signals from the motor pickoff combs, and generate a difference signal between the signals received from the motor pickoff combs, and a control loop configured to utilize the difference signal to control amplitude and pulse shape of motor drive signals output to the motor drive combs to suppress common mode oscillation in the proof masses.

DETAILED DESCRIPTION OF THE INVENTION

Figure 1:
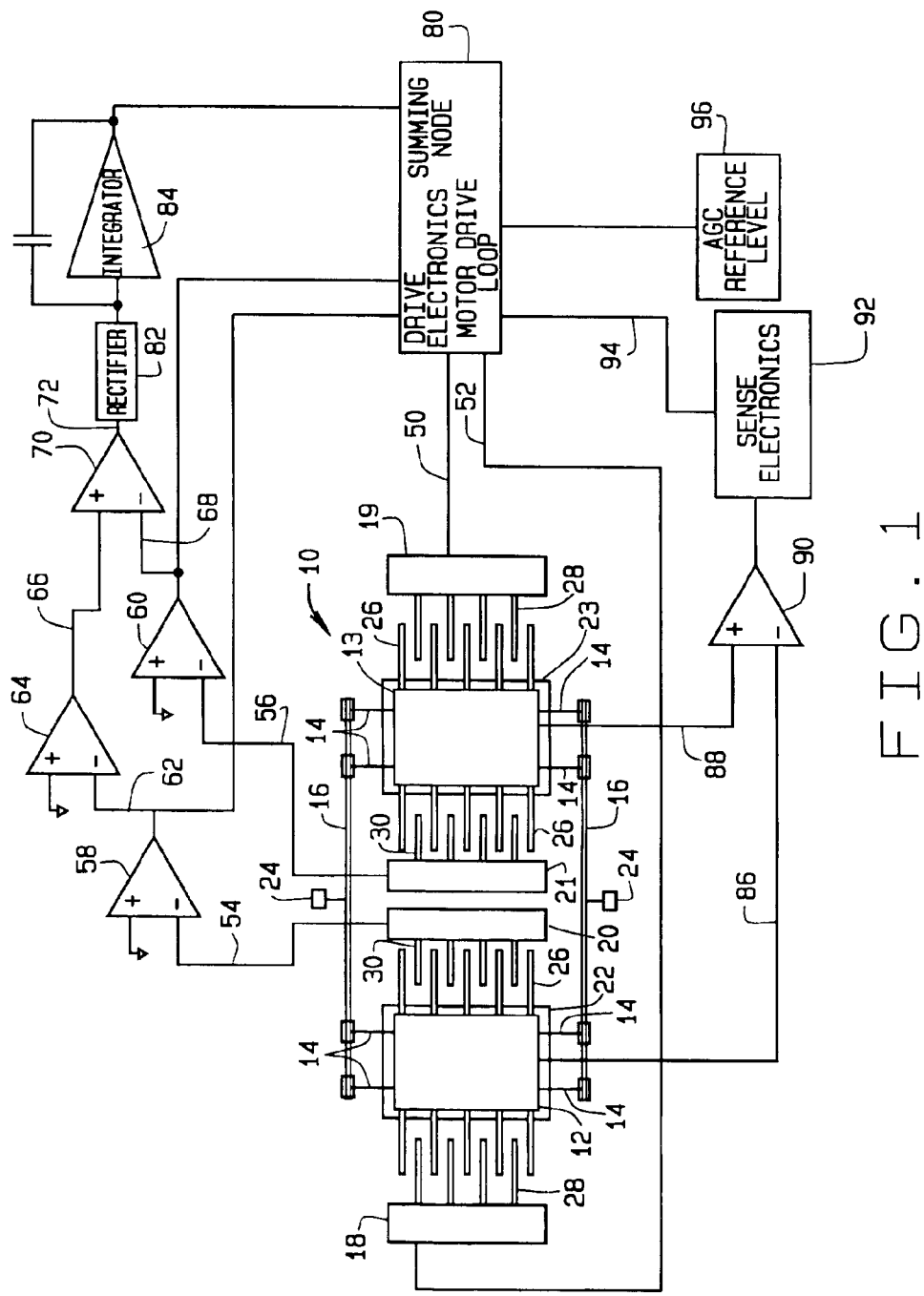
FIG. 1 is an illustration of a micro-electromechanical system (MEMS) device which incorporates common mode suppression circuitry.

FIG. 1 illustrates a plan view of a known exemplary micro-electromechanical system (MEMS) device 10, specifically a MEMS gyroscope. MEMS gyroscope 10 is formed on a substrate (not shown) and includes proof masses 12, 13, a plurality of suspensions 14 for supporting proof masses 12 and 13, and at least one cross beam 16 connected to suspensions 14. In an alternative configuration, suspensions 14 are individually and directly connected to the substrate, and a crossbeam 16 is not utilized. MEMS gyroscope 10 also includes motor drive combs 18, 19, motor pickoff combs 20, 21, and sense plates 22, 23, which correspond to individual proof masses 12. Gyroscope 10 also includes anchors 24 mounted on the substrate for support of cross beams 16.

Proof masses 12, 13 are fabricated from any mass suitable for use in a MEMS gyroscope system. In one embodiment, proof masses 12, 13 are plates of silicon. Other materials compatible with micro-machining techniques may also be utilized. While FIG. 1 shows two proof masses 12, 13, MEMS devices utilizing fewer or greater than two proof masses may also be utilized.

Proof mass 12 is located substantially between motor drive comb 18 and motor pickoff comb 20. Proof mass 13 is located substantially between motor drive comb 19 and motor pickoff comb 21. Proof masses 12, 13 each include a plurality of comb-like electrodes 26. A portion of electrodes 26 of proof mass 12 extend toward motor drive comb 18 and a portion of electrodes 26 extend toward motor pickoff comb 20. A portion of electrodes 26 of proof mass 13 extend toward motor drive comb 19 and a portion of electrodes 26 extends towards motor pickoff comb 21. While, in the illustrated embodiment, proof masses 12 and 13 have ten electrodes 26, it is known to utilize proof masses incorporating different numbers of electrodes.

Proof masses 12, 13, in the embodiment shown, are supported above a respective sense plate 22, 23 by suspensions 14. While four suspensions 14 are depicted in the Figure for suspending each proof mass 12, 13, any number of suspensions 14 may be utilized. Suspensions 14 are, in one embodiment, beams micro-machined from a silicon wafer. Suspensions 14 also act as springs allowing proof masses 12, 13 to move within a drive plane (X-axis) and a sense plane (Y-axis), as shown in FIG. 1.

The plurality of suspensions 14 are connected to at least one cross beam 16. Cross beams 16 may be connected to at least one anchor 24 providing support for proof masses 12, 13 of MEMS gyroscope 10. Anchors 24, in one embodiment, are connected to an underlying substrate (not shown). In another embodiment, anchors 24 are formed as part of the substrate. While two anchors 24 are depicted in FIG. 1, any number of anchors 24 can be utilized. Anchors 24 are positioned along a respective cross beam 16 in any manner that provides support to MEMS gyroscope 10. As described above, in an alternative configuration, suspensions 14 may be directly anchored to the substrate, thereby negating a need for cross beams 16 and anchors 24.

Motor drive comb 18 includes a plurality of comb-like electrodes 28 extending towards proof mass 12. Motor drive comb 19 includes a plurality of comb-like electrodes 28 extending towards proof mass 13. While motor drive, combs 18, 19 are shown as having four electrodes 28, the number of electrodes 28 on motor drive combs 18, 19 typically is determined by the number of electrodes 26 on the respective proof mass 12, 13. Motor drive combs 18, 19 are typically connected to drive electronics (not shown in FIG. 1). Electrodes 26 and electrodes 28 are interdigitated as they extend from respective proof masses 12, 13 and motor drive combs 18, 19 and form capacitors. The capacitors allow MEMS gyroscope 10 to sense motion in the drive plane (X-axis).

Motor pickoff comb 20 includes a plurality of comb-like electrodes 30 extending towards proof mass 12. Motor pickoff comb 21 also includes a plurality of comb-like electrodes 30 extending towards proof mass 13. While motor pickoff combs 20, 21 are depicted as having four electrodes 30, the number of electrodes 30 extending from motor pickoff combs 20, 21 is typically determined by the number of electrodes 26 on respective proof mass 12, 13. Motor pickoff combs 20, 21 are sometimes referred to as sense combs. Electrodes 26 and electrodes 30 are interdigitated as they extend from respective proof masses 12, 13 and motor pickoff combs 20, 21 and form capacitors. The capacitors allow MEMS gyroscope 10 to sense motion in the drive plane (X-axis).

Sense plate 22 is parallel with proof mass 12 and forms a capacitor. Sense plate 23 is parallel with proof mass 13 and forms a capacitor. If an angular rate (i.e. an aircraft turning) is applied to MEMS gyroscope 10 along an input plane (Z-axis) while proof masses 12, 13 are oscillating along the drive plane (X-axis), a Coriolis force is detected in the sense plane (Y-axis). The capacitance between proof mass 12 and sense plate 22 and between proof mass 13 and sense plate 23 is utilized in sensing motion in the sense plane (Y-axis). An output of MEMS gyroscope 10 typically is a signal proportional to the change in capacitance caused by the motion. Sense plates 22, 23 are typically connected to sense electronics, not shown in FIG. 1. Sense electronics detect changes in capacitance as proof mass 12 move toward and/or away from sense plate 22 and motor drive comb 18 and motor pickoff comb 20. Sense electronics are also utilized to detect changes in capacitance as proof mass 13 move toward and/or away from sense plate 23 and motor drive comb 19 and motor pickoff comb 21.

Motor pickoff combs 20, 21 are typically connected to a sense bias voltage (not shown), and motor drive combs 18, 19 are typically connected to drive electronics, (not shown). The drive electronics cause the respective proof masses 12, 13 to oscillate at substantially a tuning fork frequency along the drive plane (X-axis) by using the capacitors formed by the plurality of interdigitated comb-like electrodes 26, 28 of proof masses 12, 13 and motor drive combs 18, 19. Gyroscope 10 has two closely spaced modes of oscillation. One of the modes, sometimes referred to as a motor mode (shown in FIGS. 2 and 3 below), is driven by an electrostatic force, at a resonant frequency of gyroscope 10 to produce a relatively large amplitude of oscillation. When a rotational force is applied to gyroscope 10, a Coriolis force is produced which is proportional to the velocity of proof masses 12, 13 in the motor mode. The Coriolis force drives a second mode of oscillation of gyroscope 10, sometimes referred to as a sense mode. One or more electrodes are provided to detect oscillations in the sense mode, as described below, utilizing capacitance. A DC and/or an AC bias voltage is applied to sense electrodes, so that a motion of proof masses 12, 13 in the sense mode produces an output current.

In one embodiment, proof masses 12, 13 oscillate mechanically out-of-phase with one another and such oscillation is generally referred to as a differential mode of oscillation. For example, as proof mass 13 moves towards motor drive comb 19, proof mass 12 moves towards motor drive comb 18. However, other oscillations of proof masses 12, 13 can exist which are undesirable. In particular, proof masses 12, 13 sometimes exhibit an in-phase oscillation, for example, when proof mass 13 moves to in a first direction, proof mass 12 moves in the same direction. Such an oscillation is sometimes referred to as a common mode oscillation. Although common mode oscillations typically occur at frequencies other than a frequency of differential mode oscillation, the operational results are undesirable. To effectively eliminate more prominent common mode oscillations, electronic drive circuitry for device 10 can be modified.

By electrically controlling motor drive signals 50 and 52, common mode oscillations in the motor mode can be attenuated. MEMS gyroscope 10 also includes two motor pick-off signals 54 and 56. Motor pick-off signal 54 is out of phase with pick-off signal 56. In certain known gyroscopes, motor pick-off signals eventually are input to an operational amplifier, one input being inverting and the other input being non-inverting. Since motor pick-off signals 54 and 56 are opposite in phase, the op-amp is able to sum the two motor pickoff signals to provide an output signal. The output signal represents amplitude of motor motion (movement of proof masses 12, 13).

Referring to the embodiment shown in FIG. 1, motor pick-off signals 54 and 56 are output from motor pickoff combs 20, 21. Motor pick-off signal 54 is input to a gain stage 58, and motor pick-off signal 56 is input to a gain stage 60, which has the same amount of gain as gain stage 58. An output 62 of gain stage 58 is input to an inverter 64. An output 66 of inverter 64 is input to a non-inverting input of op-amp 70 and an output 68 of gain stage 60 is input to an inverting input of op-amp 70. By adding inverter 64 to the path of motor pick-off signal 54, and then inputting an inversion of motor pick-off signal 54 with motor pick-off signal 56 into op-amp 70, a difference between motor pick-off signals 54 and 56 will be amplified, and output from op-amp 70 as a motor pick-off difference signal 72. Difference signal 72 represents an amplitude of common mode oscillation.

As shown, difference signal 72 is input into a control loop 80 which produces motor drive signals 50 and 52. Implementation of control loop 80 to control amplitude and shape of motor drive signals 50 and 52 minimizes common mode oscillations. In one embodiment, motor drive signals 50 and 52 which are output to motor drive combs 19 and 18 respectively, have one or more of a reduced amplitude or an adjusted signal pulse shape. The amplitude and signal shape are based on inputs to control loop 80, which provide attenuation of common mode oscillations. Common mode oscillations are typically at a different frequency than motor mode oscillations caused by motor drive signals 50 and 52, but by changing amplitude and pulse shapes of motor drive signals 50 and 52, common mode oscillations can be affected. In one embodiment, control loop 80 includes a processor (not shown) which is programmed to adjust amplitudes and pulse shapes of motor drive signals 50 and 52 based upon the inputs, including difference signal 72, into control loop 80.

In one embodiment, difference signal 72 is rectified with rectifier 82 and integrated with integrator 84 before being input into control loop 80. Gain stage outputs 62 and 68 are also input, in one embodiment, into control loop 80, for control purposes. In one embodiment, control loop 80 also utilizes sense pick-off signals 86 and 88, which are amplified using amplifier 90, and output to sense electronics 92. In the embodiment, sense electronics 92 provide an output 94 to control loop 80. A reference voltage 96 is input into control loop 80 in one embodiment, for automatic gain control. The above described circuitry provides an active coupling to provide for correct mechanical phase between proof masses 40 and 42.

Figure 2:
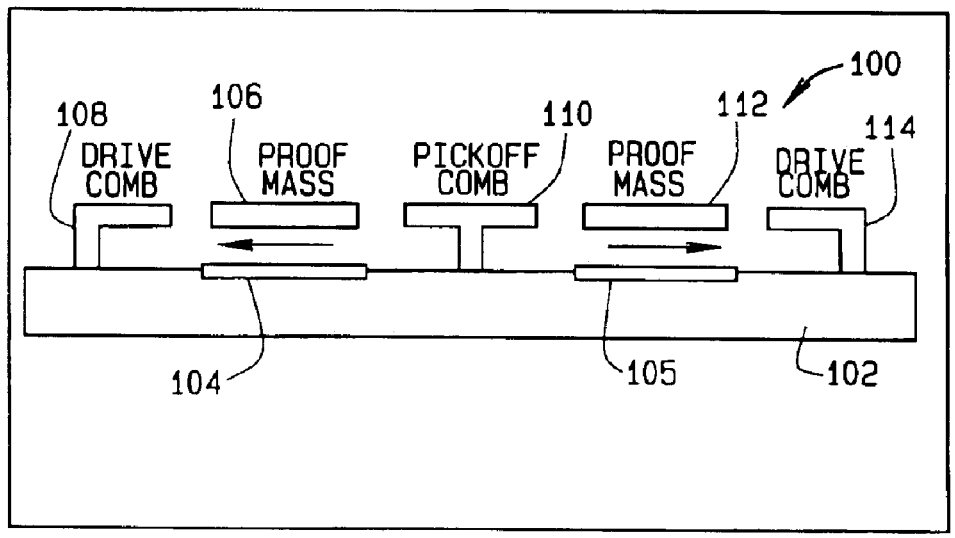
FIG. 2 is an illustration of a MEMS device exhibiting differential mode oscillation in a motor mode.

FIG. 2 illustrates of a MEMS device 100 exhibiting differential mode oscillation in a motor mode. Device 100 includes a substrate 102 to which sense plates 104 and 105 are attached. A first proof mass 106 is suspended over sense plate 104 between a first drive comb 108 and a pickoff comb 110. A second proof mass 112 is suspended over sense plate 105 between a second drive comb 114 and pickoff comb 110.

As described above, proof masses 106 and 112 oscillate between their respective drive combs 108 and 114 and pickoff comb 110 based upon applied electrostatic forces. FIG. 2 illustrates differential mode oscillation, as shown by the arrows. As first proof mass 106 moves in a first direction, second proof mass 112 moves in an opposite direction. Conversely, and not shown by arrows, as first proof mass 106 moves in the opposite direction, second proof mass 112 moves in the first direction. Differential mode oscillation in motor mode occurs at a frequency which is based upon the characteristics of the individual components and the electrostatic forces applied to MEMS device 100.

Figure 3:
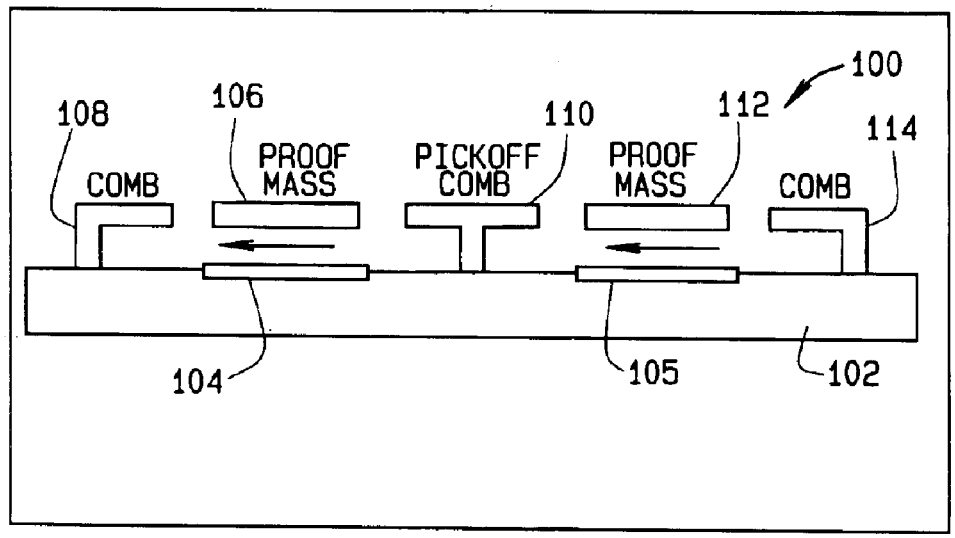
FIG. 3 is an illustration of a MEMS device exhibiting common mode oscillation in a motor mode.

FIG. 3 is an illustration of MEMS device 100 exhibiting common mode oscillation in a motor mode, as shown by the arrows. As first proof mass 106 moves in a first direction, second proof mass 112 also moves in that direction. Conversely, and not shown by arrows, as first proof mass 106 moves in a direction opposite to the first direction, second proof mass 112 also moves in the opposite direction. Common mode oscillations occur at a frequency different than that of the differential mode oscillations above described and illustrated in FIG. 2, but are still based upon the characteristics of the individual components and the electrostatic forces applied to MEMS device 100.

Figure 4:
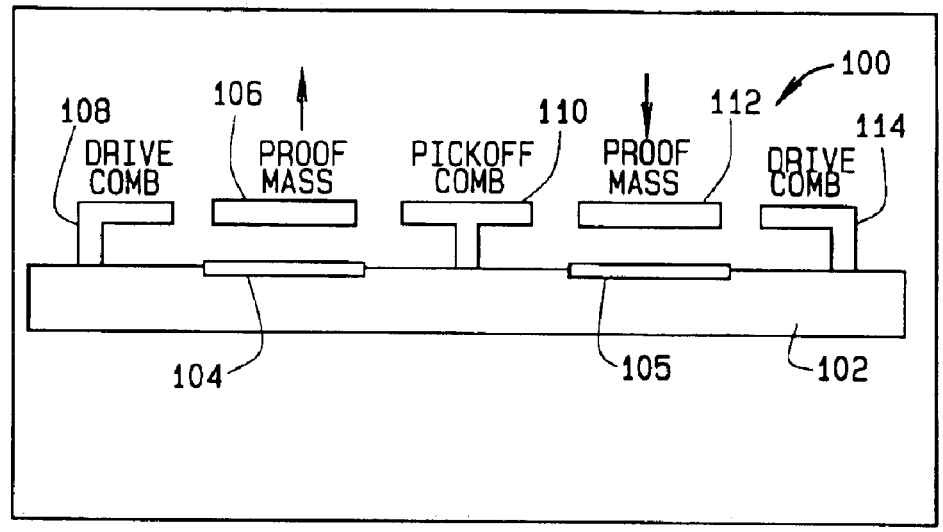
FIG. 4 is an illustration of a MEMS device exhibiting differential mode oscillation in a sense mode.

FIG. 4 is an illustration of MEMS device 100 exhibiting differential mode oscillation in a sense mode. As Coriolis forces are applied to device 100, sense mode oscillations develop, as shown by the arrows. Referring to FIG. 4, as first proof mass 106 moves in a first direction, substantially perpendicular to and away from sense plate 104, due to the Coriolis acceleration, second proof mass 112 moves in an opposite direction that is substantially perpendicular to, and towards sense plate 105. Conversely, and not shown by arrows, as first proof mass 106 moves in the opposite direction, towards sense plate 104, second proof mass 112 moves in the first direction, substantially perpendicular to, and away from sense plate 105. Differential mode oscillation in sense mode occurs at a frequency which is based upon the characteristics of the individual components and the acceleration (Coriolis) forces applied to MEMS device 100.

Figure 5:
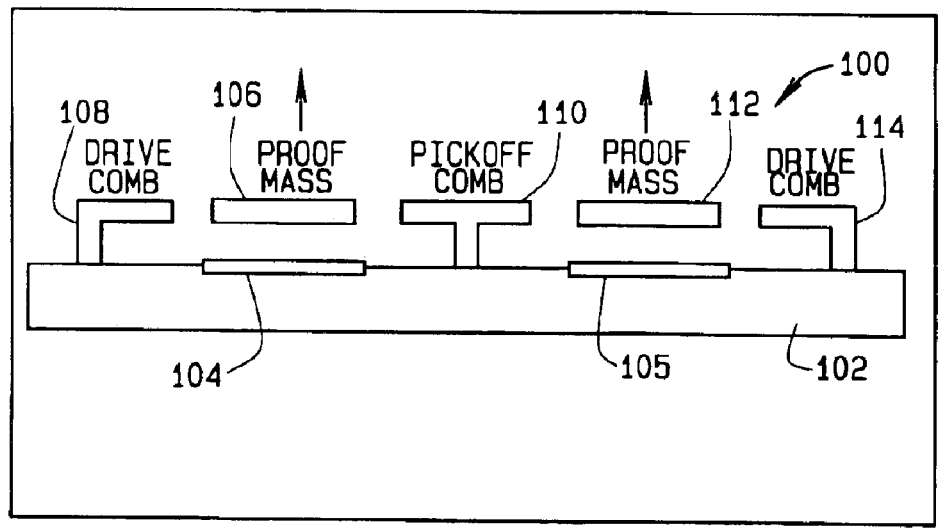
FIG. 5 is an illustration of a MEMS device exhibiting common mode oscillation in a sense mode.

FIG. 5 is an illustration of MEMS device 100 exhibiting common mode oscillation in a sense mode, as shown by the arrows. As first proof mass 106 moves in a first direction substantially perpendicular to, and away from sense plate 104, second proof mass 112 also moves in the same direction, away from sense plate 105. Conversely, and not shown by arrows, as first proof mass 106 moves toward sense plate 104, second proof mass 112 moves toward sense plate 105. Common mode oscillations occur at frequencies different than that of the differential mode oscillations illustrated in FIG. 4, but are still based upon the characteristics of the individual components and the acceleration (Coriolis) forces applied to MEMS device 100.

As operation of device 100 is based upon electrical signals received from pickoff combs, for example, pickoff comb 110, it is easily determined that common mode oscillations, albeit at different frequencies than differential mode oscillations, can affect operation of a device, and are therefore undesirable. The circuits described with respect to FIG. 1 are utilized to nullify, or at least greatly reduce, effects of common mode oscillations on electrical signals received from pickoff combs.

The above described embodiments are utilized to compensate operational characteristics of MEMS devices. While described with respect to MEMS gyroscopes, the descriptions should not be construed to be so limiting. While FIG.

1 shows MEMS gyroscope 10 as a tuning fork gyroscope, other MEMS vibratory gyroscopes that use Coriolis acceleration to detect rotation, such as an angular rate sensing gyroscope, may benefit from the use of the circuits herein described. In addition, such circuitry can be incorporated into other MEMS devices, including, but not limited to, accelerometers, inertial measurement units, resonators, pressure sensors, and temperature sensors.

While the invention has been described in terms of various specific embodiments, those skilled in the art will recognize that the invention can be practiced with modification within the spirit and scope of the claims.

What is claimed is:

1. A method for reducing effects of common mode oscillations between two respective proof masses in micro-electromechanical systems (MEMS) devices, the MEMS devices also including a motor pickoff comb, a sense plate, and a motor drive comb for each proof mass, said method comprising:
    amplifying signals received from respective motor pickoff combs;
    inverting the amplified signal from one of the motor pickoff combs;
    generating a difference signal between the inverted, amplified signal from one pickoff comb, and the non-inverted, amplified signal from the other pickoff comb;
    inputting the difference signal into a control loop; and
    generating motor drive signals for respective motor drive combs with the control loop.

2. A method according to claim 1 further comprising rectifying and integrating the difference signal before it is input to the control loop.

3. A method according to claim 1 further comprising inputting the amplified signals from the motor pickoff combs into the control loop.

4. A method according to claim 1 further comprising inputting sense pickoff signals from the proof masses into the control loop.

5. A method according to claim 1 wherein generating motor drive signals comprises changing pulse shapes of motor drive signals based upon the difference signal.

6. A micro-electromechanical systems (MEMS) device comprising:
    a substrate;
    a plurality of motor drive combs attached to said substrate;
    a plurality of motor pickoff combs attached to said substrate;
    a plurality of proof masses, each proof mass suspended above said substrate and between one of said motor drive combs and one of said motor pickoff combs; and
    a circuit configured to generate motor drive signals for said motor drive combs, said circuit configured to receive signals from said motor pickoff combs, invert one of the signals received from said motor pickoff combs, generate a difference signal between the inverted and non-inverted signals received from said motor pickoff combs, and utilize the difference signal to control amplitude and pulse shape of said motor drive signals in order to suppress common mode oscillation in said proof masses.

7. A MEMS device according to claim 6 wherein to generate said difference signal, said circuit comprises:
    a gain stage for each said motor pickoff comb, said gain stages configured to amplify the signals from said motor pickoff combs;
    an inverter configured to invert the signal from one of said motor pickoff combs; and
    an amplifier configured to receive the inverted signal and a non-inverted signal, an output of said amplifier being the difference signal.

8. A MEMS device according to claim 7 wherein each said gain stage provides a substantially equal amount of gain.

9. A MEMS device according to claim 7 wherein said circuit further comprises:
    a rectifier;
    an integrator; and
    a control loop, said rectifier configured to receive said difference signal, said integrator configured to receive an output from said rectifier, and output a rectified and integrated difference signal into said control loop, said control loop configured to control amplitude and pulse shape of said motor drive signals.

10. A MEMS device according to claim 9 wherein said control loop comprises inputs configured to receive signals from said motor pickoff combs.

11. A MEMS device according to claim 9 wherein said control loop comprises an input configured to receive sense pickoff signals from said proof masses.

12. A circuit for suppressing common mode oscillations in a micro-electromechanical systems (MEMS) device, the device including at least two motor pickoff combs which provide motor pickoff signals, said circuit comprising:
    an amplifier circuit configured to invert one of the motor pickoff signals and generate a difference signal based upon inverted and non-inverted motor pickoff signals received from the motor pickoff combs; and
    a control loop configured to receive the difference signal from said amplifier circuit, said control loop configured to control amplitude and pulse shape of motor drive signals output to the MEMS device at least partially based on the difference signal received.

13. A circuit according to claim 12 wherein said amplifier circuit comprises:
    a first gain stage for a first motor pickoff signal;
    a second gain stage for a second motor pickoff signal;
    an inverter configured to invert the amplified motor pickoff signal from said first gain stage; and
    an amplifier configured to receive an output from said inverter and an output from said second gain stage, an output of said amplifier being the difference signal.

14. A circuit according to claim 13 wherein said amplifier circuit comprises:
    a rectifier; and
    an integrator, said rectifier configured to receive the difference signal, said integrator configured to receive an output from said rectifier, and output a rectified and integrated difference signal to said control loop.

15. A circuit according to claim 13 wherein said control loop comprises inputs configured to receive signals from said first gain stage and said second gain stage.

16. A circuit according to claim 12 wherein said control loop comprises an input configured to receive sense pickoff signals from proof masses of the MEMS device.

17. A circuit according to claim 12 wherein said control loop comprises a processor programmed to control amplitude and pulse shape of motor drive signals output to the MEMS device at least partially based on the difference signal received.

18. A method for suppressing common mode oscillations between proof masses in micro-electromechanical systems (MEMS) devices, the devices also including motor drive combs and motor pickoff combs, said method comprising:

receiving motor pickoff signals from motor pickoff combs;

inverting one of the received motor pickoff signals:

generating a difference signal from the inverted and non-inverted motor pickoff signals; and controlling pulse shapes of motor drive signals applied to motor drive combs based upon the difference signal.

19. A method according to claim 18 wherein inverting one of the received motor pickoff signals and generating a difference signal from the inverted and non-inverted motor pickoff signals comprises:

amplifying a first motor pickoff signal;

amplifying a second motor pickoff signal;

inverting the amplified first motor pickoff signal; and generating a difference signal between the inverted, amplified first motor pickoff signal and the amplified second motor pickoff signal.

20. A method according to claim 18 wherein controlling pulse shapes of motor drive signals comprises implementing a control loop configured to control amplitude and pulse shape of motor drive signals output to the MEMS device at least partially based on the generated difference signal.

21. A micro-electromechanical systems gyroscope configured to suppress common mode oscillation, said gyroscope comprising:

a substrate;

a plurality of motor drive combs attached to said substrate;

a plurality of motor pickoff combs attached to said substrate;

a plurality of proof masses, each said proof mass suspended above said substrate and between one of said motor drive combs and one of said motor pickoff combs;

an amplifier circuit configured to receive motor pickoff signals from said motor pickoff combs, invert one of the motor pickoff signals, and generate a difference signal between the inverted and non-inverted motor pickoff signals; and a control loop configured to utilize the difference signal to control amplitude and pulse shape of motor drive signals output to said motor drive combs to suppress common mode oscillation in said proof masses.

* * * * *